(12) United States Patent
Kozenkov et al.

(10) Patent No.: US 8,576,485 B2
(45) Date of Patent: *Nov. 5, 2013

(54) PHOTO-INDUCED DICHROIC POLARIZERS AND FABRICATION METHODS THEREOF

(75) Inventors: Vladimir Markovich Kozenkov, Hong Kong (CN); Wing Chiu Yip, Hong Kong (CN); Vladimir Grigorievich Chigrinov, Hong Kong (CN); Hoi Sing Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/923,546

(22) Filed: Sep. 28, 2010

(65) Prior Publication Data

US 2012/0307363 A1 Dec. 6, 2012

Related U.S. Application Data

(60) Continuation-in-part of application No. 11/331,357, filed on Jan. 13, 2006, now abandoned, which is a division of application No. 09/853,648, filed on May 14, 2001, now Pat. No. 7,070,913.

(51) Int. Cl.
| | |
|---|---|
| G02B 27/28 | (2006.01) |
| G02B 5/30 | (2006.01) |
| G02B 5/23 | (2006.01) |
| G03F 1/00 | (2012.01) |
| G03F 7/00 | (2006.01) |

(52) U.S. Cl.
USPC .............. 359/487.02; 252/586; 359/489.19; 359/492.01; 427/162; 430/200; 430/256; 430/281.1; 430/286.1; 430/320; 430/321; 430/322; 534/672; 534/825; 534/856; 534/875

(58) Field of Classification Search
USPC .............. 252/299.01, 299.1, 299.4, 299.68, 252/299.67, 582, 586; 349/96, 97, 123, 349/124, 134, 135, 136; 359/490, 491, 502, 359/487.02, 489.19, 492.01; 427/162, 427/163.1, 163.3, 372.2, 375, 385.5, 487, 427/508, 514, 520, 553, 558, 595; 428/1.1, 428/1.2, 1.23, 1.25, 1.26, 1.31; 430/7, 20, 430/200, 256, 320, 321, 322, 281.1, 286.1; 534/672, 825, 856, 875

See application file for complete search history.

(56) References Cited

U.S. PATENT DOCUMENTS

| | | |
|---|---|---|
| 4,759,611 A | 7/1988 | Downey, Jr. |
| 5,024,850 A | 6/1991 | Broer et al. |

(Continued)

FOREIGN PATENT DOCUMENTS

| | | |
|---|---|---|
| JP | 56-036612 A | 4/1981 |
| JP | 2001-305526 A | 10/2001 |

OTHER PUBLICATIONS

V.M. Kozenkov, W.C. Yip, S.T. Teng, V.G. Chigrinov, and H.S. Kwok, SID "00 International Symposium Digest of Technical Papers, vol. 31, Society for Information Display, San Jose, CA, 2000, pp. 1099-1101.*

(Continued)

*Primary Examiner* — Bijan Ahvazi
(74) *Attorney, Agent, or Firm* — Leydig, Voit & Mayer, Ltd.

(57) ABSTRACT

A method of forming a polarizing material is provided including exposing a layer of dichroic material to activating light illumination to provide an ordered structure with a distinguished absorption axis and thus photo-induce polarization, and fixing the induced polarization by polymerization of the dichroic layer. Novel polarizing materials formed thereby are also provided. By selectively exposing regions of the dichroic material to differing activating radiation, different regions with different polarization axes can be created. The polarizing material can also be provided with a coating or coatings to alter the spectral responses, and a stack formed of a plurality if dichroic layers can be provided.

8 Claims, 11 Drawing Sheets

(56) References Cited

U.S. PATENT DOCUMENTS

| | | | |
|---|---|---|---|
| 5,286,418 | A | 2/1994 | Nakamura et al. |
| 5,340,504 | A | 8/1994 | Claussen |
| 5,739,296 | A | 4/1998 | Gvon et al. |
| 6,049,428 | A | 4/2000 | Khan et al. |
| 6,630,289 | B1 * | 10/2003 | Kwok et al. .......... 430/321 |
| 7,108,897 | B2 | 9/2006 | Oiso et al. |
| 7,381,507 | B2 * | 6/2008 | Kwok et al. .......... 430/20 |

OTHER PUBLICATIONS

W.C. Yip, H.S. Kwok, V.M. Kozenkov, V.G. Chigrinov, Photo-patterned e-wave polarizer, Display 22, 27-32, 2001.*

Martin Schadt, Hubert Seibeh.Le, Andreas Schuster and Stephen M. K Elly,Photo-Generation of Linearly Polymerized Liquid Crystal Aligning Layers Comprising Novel, Integrated Optically Patterned Retarders and Color Filters, Jpn. J. Appl. Phys. vol. 34 (1995) pp. 3240-3249.*

V. Mateev et al., Temperature Dependence of Photoinduced Anistropy in Rigid Solutions of Azo Dyes, *J. Phys. Chem.*, 1992, 96, 3055-3058, 1992 American Chemical Society.

V.M. Kozenov et al., Thin Photo-Patterned Internal Polarizers for LCDs, 47.3/Kozenov, SID 00 DIGEST 1-3; May 2000.

V.M. Kozenkov, W.C. Yip, S.T. Tang, V.G. Chigrinov and H.S. Kwok, "Thin photo-patterned internal polarizers for LCDs", 47.3/Kozenkov, SID 00 Digest 1-3, May 2000.

V. Mateev et al., "Temperature Dependence of Photoinduced Anisotropy in Rigid Solutions of Azo Dyes," J.Phys. Chem., 1992, 96, pp. 3055-3058, American Chemical Society.

\* cited by examiner

PHOTO-INDUCED DICHROIC POLARIZERS AND FABRICATION METHODS THEREOF

CROSS REFERENCE TO RELATED APPLICATIONS

This application is a continuation-in-part of U.S. patent application Ser. No. 11/331,357, filed Jan. 13, 2006, which is in turn a divisional of application Ser. No. 09/853,648, filed May 14, 2001, now U.S. Pat. No. 7,070,913 issued on Jul. 4, 2006, wherein the entire contents of such applications are incorporated herein by reference.

FIELD OF THE INVENTION

This invention relates to methods of fabricating polarizers from dichroic materials, and to polarizers fabricated by such methods. In particular, the invention relates to photochemically stable dichroic molecules and the device structures, which are suitable for the fabrication of thin light polarizers.

BACKGROUND OF THE INVENTION

Light-polarization films or polarizers are major components liquid crystal displays (LCDs) and other liquid crystal (LC) devices. Commercial polarizers are usually based on polyvinyl-alcohol-iodine (PVA) films of 150-400 μm thick. These polarizers are generally placed on the external glass surfaces of the LC cell and require protective films (e.g. cellulose triacetate or cellulose acetate butyrate). The fabrication of such known commercial polarizers is rather complicated and expensive. Recently, to improve the cost-effectiveness, there have been proposals to fabricate the light polarizers by printing or photo-alignment technologies.

In U.S. Pat. Nos. 5,739,296 and 6,049,428, polarizing films are formed from dyestuffs, which have stable lyotropic liquid crystalline phases in a wide range of concentrations, temperatures and pH-values. In a sheared flow, the lyotropic liquid crystal molecules are self-assembled and oriented preferentially in connection with the flow direction. When the proper preparation conditions are met, a well ordered solid phase of the lyotropic liquid crystal is formed. In certain cases, the order parameter as a measure of this alignment effect is high, so that this material is suitable for the fabrication of polarizers. To create this sheared flow, rollers and blades have been suggested.

To minimize any defects due to the shear flow alignment, a photo-alignment technology to prepare the thin photo-patterned polarizer has been proposed [V. Kozenkov et al, SID'00 DIGEST, p. 1099]. Since this is a non-contact method, the particulates and static charges generated can be in principle eliminated. In addition, the cross contamination problems can be minimized. With a birefringent mask, this technique makes the fabrication of multi-domain structures more cost-effective for the wide viewing-angle LCD applications.

There are various methods known for forming polarizing materials. One such method described in JP 2001-305526 requires the physical stretching of a substrate in order to induce polarization. It can be difficult to physically manipulate a substrate with precision, and stretching a substrate also means that it is hard to accurately create a substrate with a predetermined pattern of polarization. Further, this method does not give anisotropy of birefringence.

SUMMARY OF THE INVENTION

According to the present invention there is provided a method of forming a polarizing material comprising the steps of: (a) forming a layer of a dichroic material on a substrate, and (b) exposing said layer to activating light illumination to provide an ordered structure with a distinguished absorption axis. Preferably the layer may be polymerized.

Preferably different regions of the polarizing material are polarized by activating radiation with different polarization axes so as to produce regions of said polarizing material with differing axes of polarization. This may be achieved by regions of the layer being exposed independently by the use of masks to isolate selected regions for exposure. Alternatively a birefringence mask may be used to create activating radiation with a selected spatial distribution of polarization vectors.

In preferred embodiments the layer may be provided with a coating (e.g. iodine) to change its spectral response. If different regions of the layer are formed with different coatings a multi-color polarizing material may be produced.

A stack of layers may be formed on a substrate with the layers being separated by isolation layers.

The activating radiation is polarized or non-polarized, but directed and may be a continuous waveform or may be pulsed. The polarization of the dichroic layer may be controlled by varying parameters selected from the group consisting of the incident angle of the activating radiation, the exposure energy density and the process temperature.

According to the present invention there is also provided a polarizing material comprising a layer of a photochemically stable dichroic absorber. Preferably the absorber is formed within a polymer matrix.

The dichroic absorber may be selected from the group consisting of: mono-, bis-, tris-, and poly-azo dyes, quinone dyes, mono- and poly-oxyanthraquinone dyes, sulfur-substituted hydroxythio-anthraquinone dyes, aminohydroxy-anthraquinone dyes, anthrapyrimidinone dyes, merocyane dyes, azomethine dyes, polycyclic compounds, benzoquinones, napthoquinones, tolanes, diphenyls, p-nitroanilines, p-nitrosodialkylanilines, dialkylaminostyroles.

The polymeric materials may be selected from the group consisting of: polyimide, polyethylene, cellulose acetate, polystyrene, polycarbonate, polyester, polyacrylonitrile, polyacetal, polyacrylamide, polybutadiene, polyvinylalcohol, polymethylmethacrylate, and polyvinylcinnamate.

The polarizing material may be provided with a coating of a material (e.g. iodine) selected to alter the spectral response of said material.

BRIEF DESCRIPTION OF THE DRAWINGS

Some examples of the invention will now be described by way of example and with reference to the accompanying drawings, in which:—

FIG. 1 shows the transmittance of an azodye film during the pumping (a) and the dark relaxation (b), the molecular transformation is pumped by a laser beam of about 100 mW/cm$^2$ at 488 nm or 514 nm, whereas the signal is probed by a 0.2 mW-633 nm laser source, FIG. 3 shows the transmission spectra of the exposed azodye film before (a) and after (b) treatment with iodine.

DETAILED DESCRIPTION OF PREFERRED EMBODIMENTS

Before describing a number of embodiments and examples of the present invention, it would be useful to define a number of terms to be used in this specification.

By "anisotropically absorbing molecules", reference is made to compounds with anisotropic geometry, such as rod-shaped or disc-shaped, which exhibit absorption properties with different values along different axes. For example, dichroic compounds and lyotropic liquid crystal compounds are anisotropic absorbers.

By "linear polarized light" is meant light that is polarized mostly along one axis (the major axis) of a plane orthogonal to the propagation direction.

The term "photochemically active molecules" refers to molecules that are involved in irreversible or reversible photochemical reactions. In the solid phase, the quantum efficiency associated with the photochemical reaction is about 0.1-1.

The term "photochemically stable molecules" refers to molecules that are no longer involved in the irreversible or reversible photochemical reaction. In the solid phase, in such cases the quantum efficiency associated with the photochemical reaction is about $10^{-8}$-0.1.

The term "photostable molecules" refers to cases where the quantum efficiency associated with the photochemical reaction is less than $10^{-8}$.

By the term "photo-anisotropic medium" (PAM) is meant that the isotropic solid phases of photochemically active, photochemically stable and photostable molecules exhibit photo-induced anisotropy (absorption dichroism and birefringence), upon the absorption of polarized or non-polarized photons. The induced anisotropy is associated with the direction of polarization vector, the incident angle and exposure energy of the light illumination.

The term "substrate" refers to any medium able to support the formation of thin surface layers of PAM for example. A substrate can be any solid combination of layered materials. The materials can be any combination of glass, silicon, oxides, plastics and metals. In particular, silver, gold, aluminum, polyimide, silicon monoxide, indium-tin-oxide, silicon dioxide, and color filter layers are common examples.

Figure 1A:
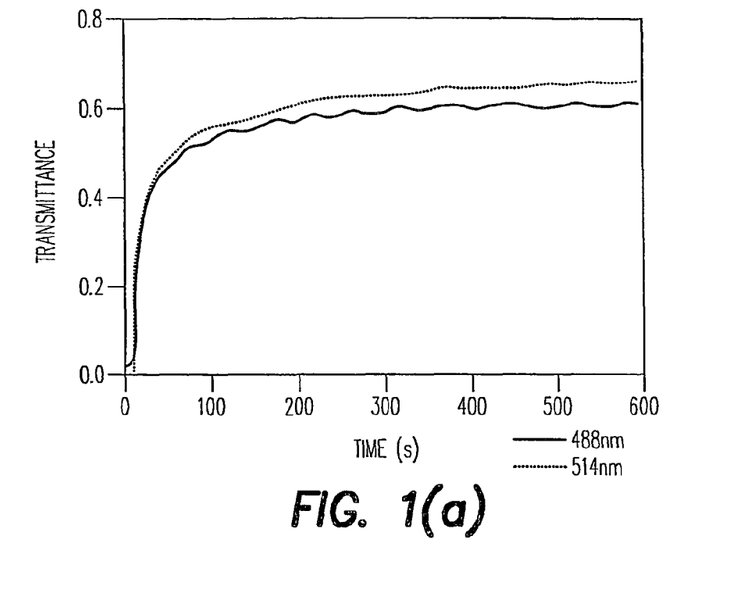

As will be seen from the following description of preferred embodiments and examples, the present invention provides photo-induced polarizers formed of dichroic materials. In particular, as can be seen from FIG. 1(a), when the dichroic molecules are exposed to a low power actinic radiation, long-lasting optical anisotropy and dichroism are photo-induced.

There are two major types of physical mechanisms, which give rise to the photo-induced phenomena. The first is based on irreversible photo-chemical reactions, such as photo-induced cross-linking and photo-decomposition. The anisotropic layers formed in this way are characterized by a small value of the order parameter (<0.4) and the corresponding low value of the induced optical anisotropy and dichroism. The order parameter is very sensitive to the exposure time and chemical content of the substance and has to be accurately controlled. Moreover the contamination of the initial substance by the by-products of the photo-degradation is possible in certain cases. The dichroic spectra of these substances considerably change its form during the exposure. All these disadvantages prevent the application of the absorbing layers, formed by photo-chemical mechanism as dichroic polarizers.

Figure 1B:
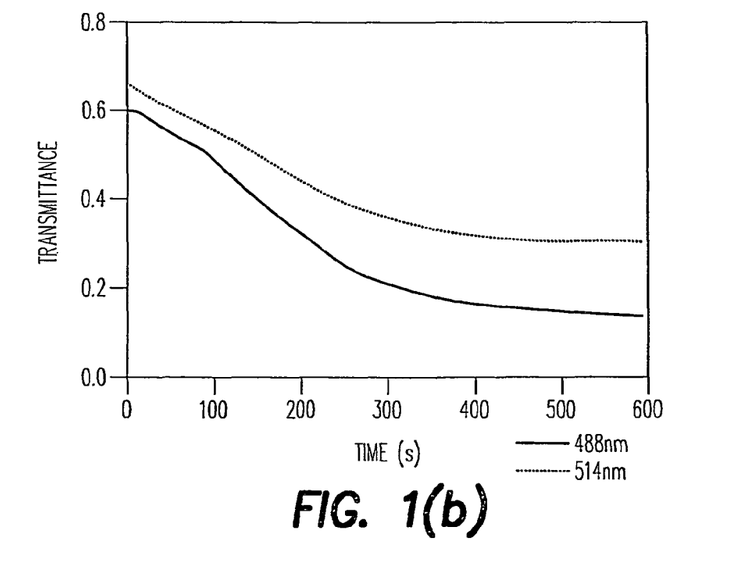

The second mechanism is based on the reversible cis-trans isomerization and Weigert effect, i.e. Brownian motion in a potential field of the actinic light. The probability $\epsilon$ of photo-absorption is proportional to the square of cosine angle between the polarization vector of actinic light $E_{hv}$ and the vectorial absorption dipole $\mu_{ge}$, i.e. $\epsilon \sim |\mu_{ge} \cdot E_{hv}|^2$. In other words, the molecules that have their transition dipole moments parallel to the direction of the polarized light will probably undergo the conformational molecular changes. Consequently, these will lead to a non-uniform distribution of molecules. However, with this mechanism when the pumping light source is removed, the molecules and domains relax slowly (FIG. 1b). The order parameter as a measure of these photo-induced effects can be very high in some dichroic materials, but since these are reversible processes, blending with a polymer matrix or polymerization to form a network is preferable so as to fix the alignment against any thermal or photo perturbation. Therefore, a polarizer can be produced by this clean and non-contact method. In addition, the fabrication methods for multi-layers, -axes and -color photo-induced polarizers based on the same dichroic materials are described in the following. The polarizers and the polarizer fabrication techniques described in this specification are all compatible with current LCD manufacturing techniques.

The photo-induced optical anisotropy of PAM takes place due to the orientational molecular ordering. The major axis of induced anisotropy is perpendicular to the direction of polarized activating radiation. It will however be parallel to the plane of incidence for the non-polarized actinic radiation. Some of the photochemically stable substances give rise to the high molecular order parameter S>0.8 and are thermally stable up to the melting temperature of the substances. In some cases, the corresponding temperature is 140° C.-180° C. In addition, the spectral absorption changes of these substances are not noticeable.

The PAMs materials can be based on photostable organic compounds and dichroic dyes with an anisotropic absorption either in UV-, visible or IR-spectral region in the range between 200 and 2000 nm and, in particular, in the visible region between 400 and 800 nm.

These substances belong to the following dye groups: mono-, bis-, tris- and poly-azo dyes, metal-complex azo dyes; quinone dyes; mono- and poly-oxyanthraquinone dyes, sulphur-substituted hydroxythio-anthraquinone dyes, aminohydroxy-anthraquinone dyes; anthrapyrimidinone dyes; merocyane dyes; azomethine dyes; polycyclic compounds; benzoquinones and naphthoquinones; tolanes; diphenyls; p-nitroanilines, p-nitrosodialkylanilines; dialkylaminostyroles, etc. Besides, these substances can have bi-functional reactive groups, which polymerize by thermal or photo treatment to form a polymer network. Alternatively, these substances can be introduced as the chromophores in the polymer matrix. Some examples of the polymer matrix are polyimide; polyethylene, cellulose acetate; polystyrene; polycarbonate; polyester; polyacrylonitrile; polyacetal, polyacrylamide; polybutadiene; polyvinylalcohol; polymethyl-methacrylate; polyvinylcinnamate. In both cases, the thermal, optical, electrical and mechanical properties can be improved. Usually the concentration of the substances in the polymer matrix does not exceed 5-15 wt/wt % so that the final thickness cannot be too thin however. The additives, which promote good adhesion, suitable viscosity and low curing temperature, can also be introduced.

Various methods can be used to put the PAM layer to the substrate, including spin-coating, dipping, spraying, brushing, printing, Langmuir-Blodgett technique and thermal evaporation in vacuum.

The following examples demonstrate the device structures, fabrications and applications of the photo-induced polarizers using the PAM materials. The PAM layers, obtained in the following examples, can be deposited on rigid or flexible substrates.

EXAMPLE 1

A thin film of the following azodye (1)

(1)

is prepared by the method of vacuum sublimation at pressure of about $2 \cdot 10^{-5}$ mm Mercury. The deposition temperature onto two glass plates is 20° C. The melting temperature of the azodye is 146° C. The deposition rate is 0.93 nm/sec and the total deposition time is 4.5 minutes. The final thickness of the azodye layer is 0.25 microns. During the deposition process, one of the glass plates is in-situ exposed to a linearly polarized light. The light is generated by a 250-Watt Mercury lamp with peak wavelength at 546 nm and the power density is 22.3 mW/cm². The same polarized light exposes the second glass plate after the azodye layer has been formed. It is found that the photo-induced optical retardation of the azodye, which is measured at wavelength 632.8 nm, is equal to $\lambda/12$. This is significant for many display applications. The energy densities for the first and second glass plates are about 4.1 J/cm² and 12.7 J/cm² respectively.

EXAMPLE 2

Another useful azodye (2) is shown below.

(2)

Figure 2:
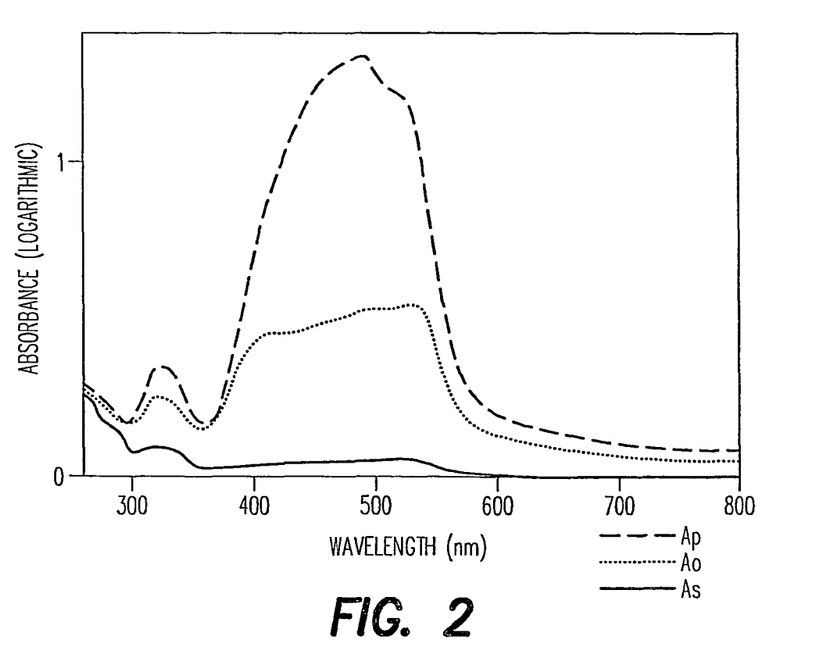
FIG. 2 shows the absorption spectra of the exposed azodye film, $A_0$ represents the absorbance before the illumination, and p and s are the suffixes of p- and s-waves.

To prepare the PAM layer, 1-10 wt % solution of the azodye in chlorobenzene is spin-coated on a glass substrate at room temperature. This solid dye film is then irradiated at normal incidence by a polarized UV light. The light source is a 1000 W Oriel Xenon arc lamp. The UV sheet polarizer is purchased from Oriel Instruments. The intensity of polarized UV light at 365 nm is about 6 mW/cm². The energy density is about 10.8 J/cm². In FIG. 2, the absorption spectra of azodye (2) are shown, and the order parameter calculated in this case is 0.86.

FIG. 2 shows the absorption spectra prior to exposure to polarized light (Ao) and of the p (Ap) and s (As) waves respectively after exposure to polarized light. The high absorption of the p wave in contrast to the s wave shows that the azodye layer is effectively polarized.

EXAMPLE 3

Figure 3A:
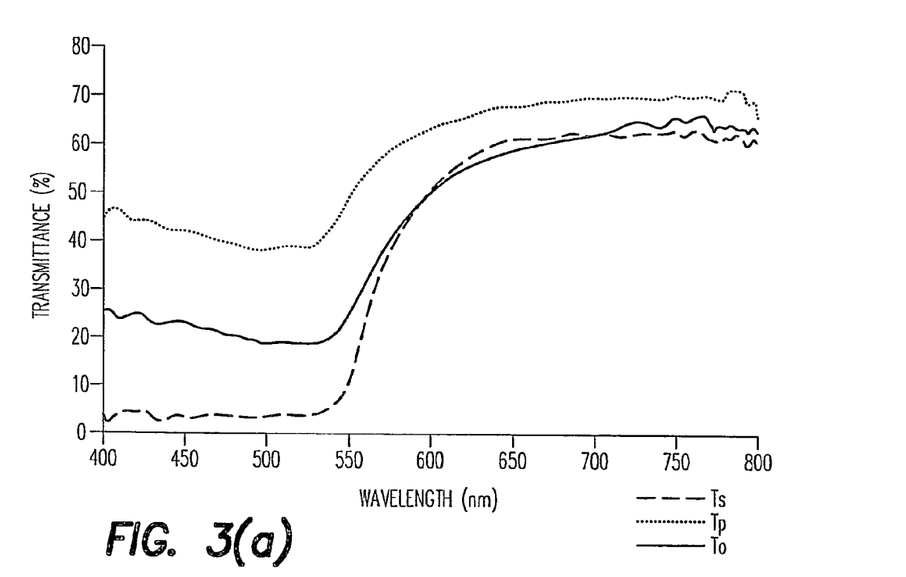
Figure 3B:
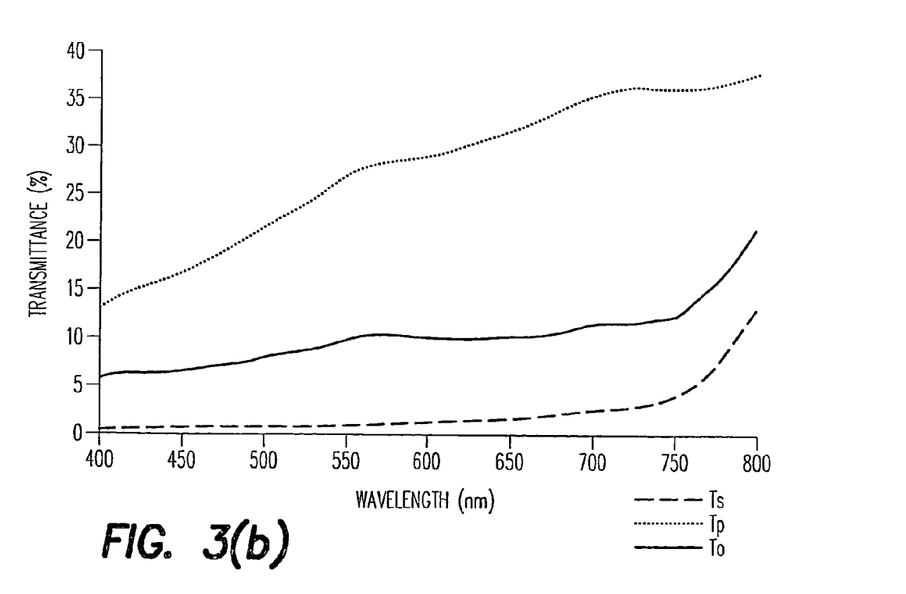

The azodye layer can have a top coating of iodine or alcohol molecules. Such a coating may change the spectra of the dye making it more useful for applications in the visible light range. FIG. 3 shows the transmission spectra of the azodye (2) before (a) and after (b) the treatment with iodine. The exposed PAM layer is prepared in accordance with Example 2, and then the iodine molecules are evaporated at room temperature and atmospheric pressure. The film thickness of iodine molecules has been measured in a control experiment. In the present example, a thin film of about 20 nm is deposited on top of the exposed PAM layer. The coated layer is stable against the ambient light and low power laboratory lasers.

EXAMPLE 4

Figure 4:
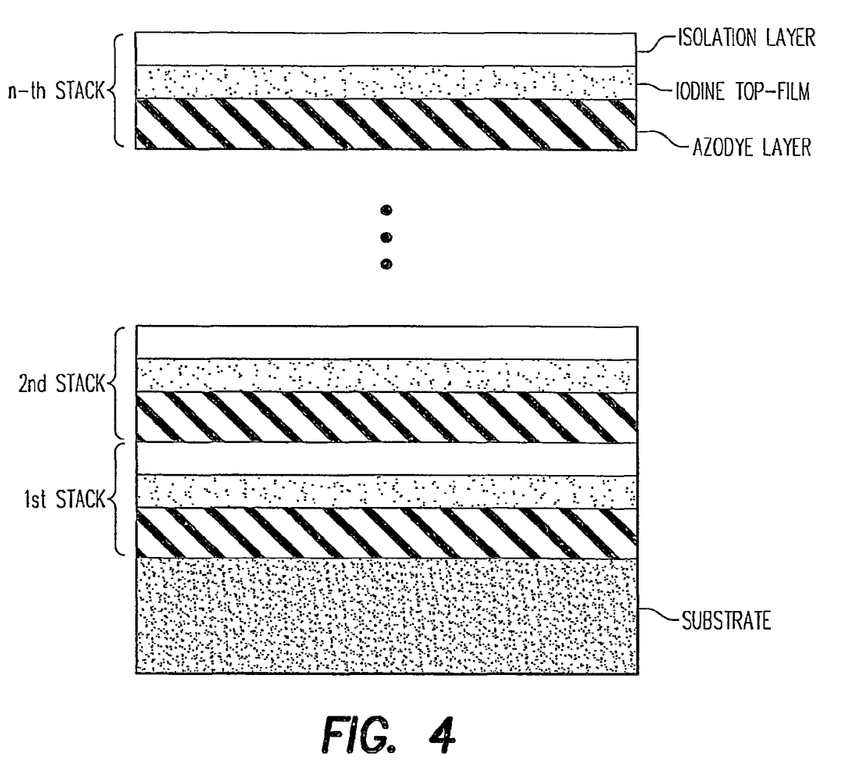
FIG. 4 shows an embodiment of the invention in the form of a multi-layer structure.

To optimize the extinction ratio and optical transmittance, a multi-layers structure may be formed as shown in FIG. 4. The exposed PAM layer, which has a top coating of iodine, is prepared in accordance with Example 3. However, the thickness of the PAM layer and the top coating are reduced accordingly. To isolate this coated layer from each other, a thin layer about 10 nm of polymer such as polyvinyl-alcohol is thermally evaporated onto the iodine layer. This embodiment of the invention improves both the optical and mechanical properties of the resultant polarizer.

EXAMPLE 5

Figure 5:
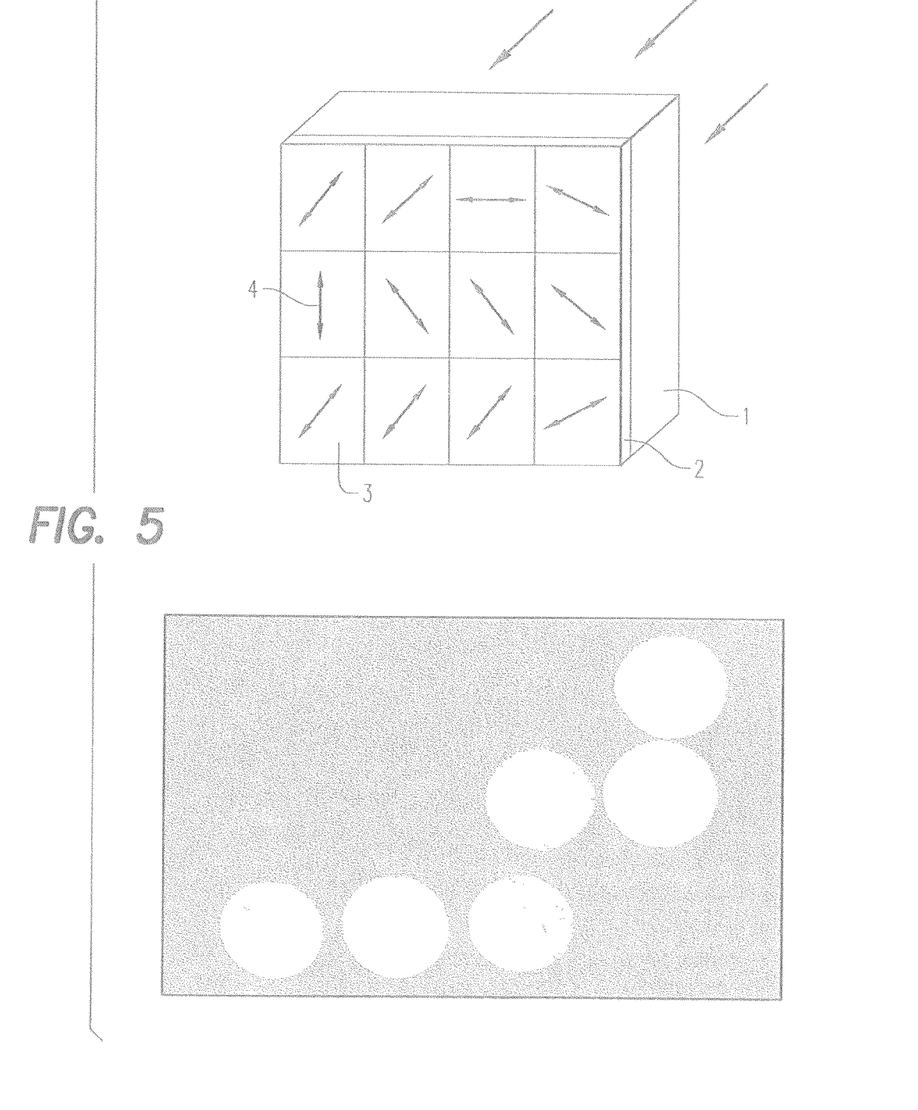
FIG. 5 shows an embodiment of the invention with a polarizer having areas of different polarization axes.
Figure 6:
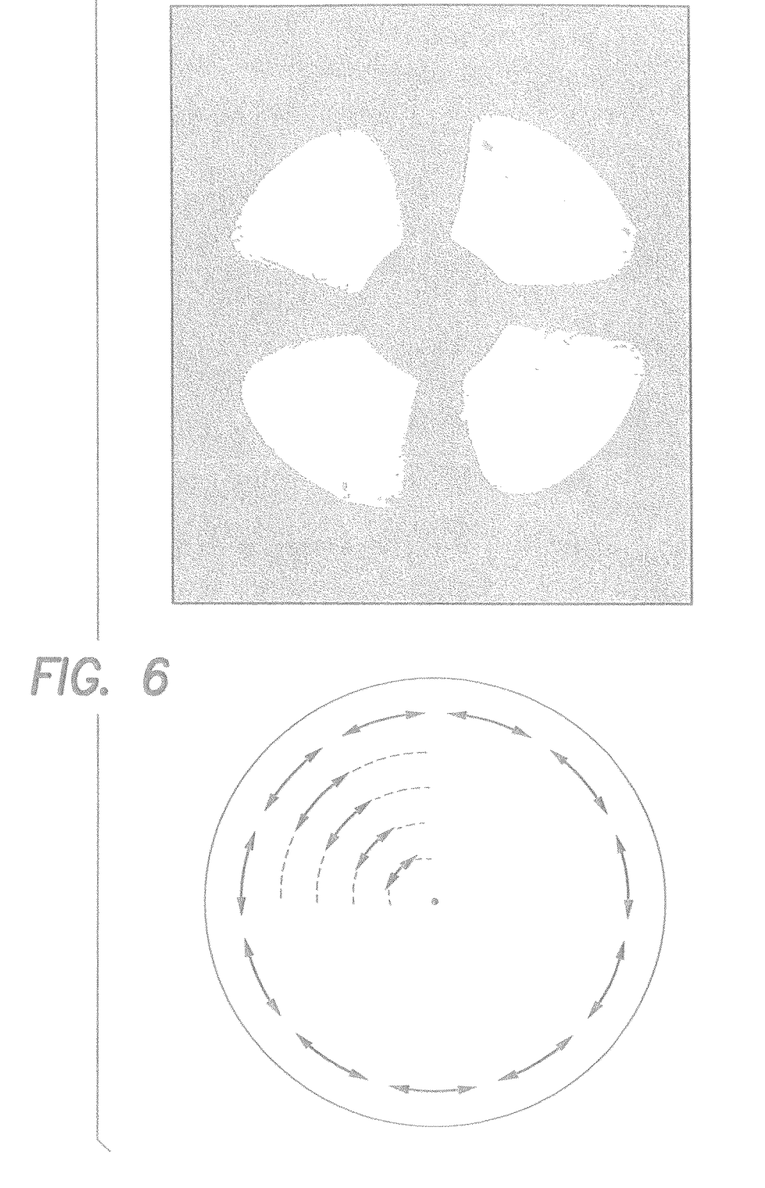
FIG. 6 shows another embodiment of a multi-axes photo-induced polarizer.

The preferred orientation of the dye molecules and consequently the direction of the polarization axis can be independently varied in different surface regions. The sizes of these regions may vary from several microns to tenths of centimeters. FIG. 5 shows an embodiment of the invention in the form of a multi-axis photo-induced polarizer, which has different local polarization axes in different regions. A dichroic layer 2 is formed on a substrate 2 and is divided into a plurality of regions 3. Each region 3 is exposed selectively by polarized light in order to induce the polarization shown by the polarization axes 4. The different regions may be formed by masking the remainder of the azodye layer and subjecting a selected region to a particular form of polarized light. Each region may thus be polarized in turn. FIG. 6 provides another possible realization of the multi-axes polarizers. FIG. 6 shows the result of illuminating a plate bearing a dichroic layer with axially polarized light and allowing the plate to rotate. This creates the polarization distribution shown in FIG. 6. Because the dichroic layer will be polarized in a direction perpendicular to the axis of the polarizing light, the rotational movement of the plate results in circumferential polarization. The photographs in crossed polarizers illustrate the corresponding distribution of the intensity variations.

EXAMPLE 6

Figure 7A:
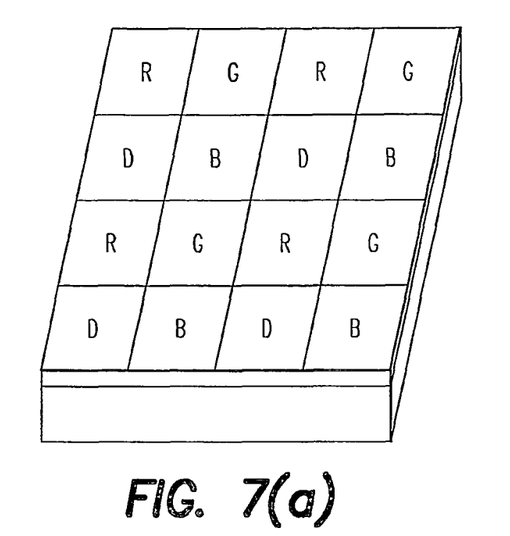
FIG. 7 shows embodiments of the invention with multi-color structures.
Figure 7B:
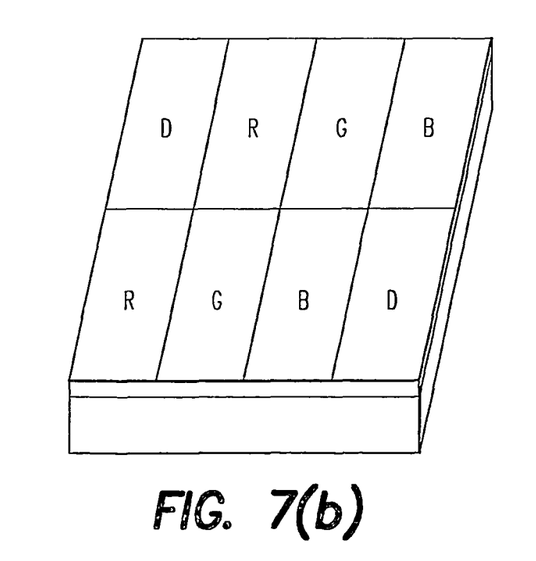

The absorption bands of the dye molecules and consequently the color can be independently varied in different surface regions. The sizes of these regions vary from several microns to tenths of centimeters. FIGS. 7 (*a*) and (*b*) show the multi-color photo-induced polarizers, which have different local absorption spectra in different regions. In the figures the letters R, G, B and D stand for red, green, blue and dark respectively as examples. This can be achieved by applying different coatings to different regions in order to provide different spectral responses in the various regions.

EXAMPLE 7

Figure 8:
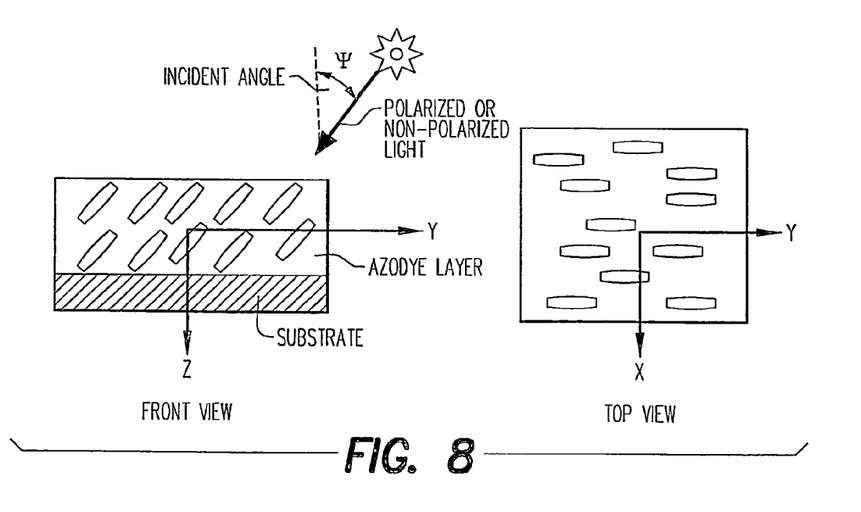
FIG. 8 is an illustration of induced optical anisotropy when an azodye layer is illuminated obliquely by a polarized or non-polarized but directed light.

The direction of polarization axis can be induced using the obliquely incident polarized or non-polarized light (FIG. 8). The optical anisotropy and dichroism depend on the exposure energy, incident angle and process temperature. This makes possible the uniform polarization direction on the curved surface (e.g. lens) or micro-objects with a surface relief profile (e.g. diffraction gratings).

EXAMPLE 8

This example is similar to Examples 1 and 3, but surface-active azo dyes (AD-2) were used:

(AD-2)

Solid state mono- or multimolecular thin films of 0.01 to 0.2 microns were obtained by the Langmuir-Blodgett (L-B) technique.

A super-high-pressure Mercury lamp used as a source of UV-irradiation giving a power of 250 W combined with glass light filters and Glan-Thompson prism.

In the initial state, the film displayed neither dichroism nor birefringence. The absorption spectrum of the film had a maximum absorption band at λ=480 nm. In the region λ>550 nm, such films are transparent. Under exposure to polarized activating radiation, both the value of the orientational order parameter in the plane of a film and the amount of birefringence increased during illumination, and achieved steady-state values of about 0.75 and 0.24 respectively.

An even longer period of illumination resulted in some increase in the size optical anisotropy, even when the photo-induced anisotropy reached a saturation point.

Various zones of film layers were exposed through masks having different directions of vector polarization, activating irradiation and/or density energy. Anisotropic elements were formed, these elements being useful as photo-patterned color polarizers in spectral regions of 400-500 nm and as phase retarded photo-patterned layers in spectral regions more 550 nm.

EXAMPLE 9

FIG. 6 shows the result of illuminating a rotating plate bearing a photo-anisotropic layer with axially polarized radiation. This created the polarization distribution shown in FIG. 6 (indicated by the arrows). Because layers are polarized in a direction perpendicular to the axis of the polarizing radiation, the rotational movement of the plate resulted in circumferential polarization. The photograph illustrates the corresponding distribution of the intensity variations.

EXAMPLE 10

In this example the initially isotropic layer of PAMs (having photochemically active/photosensitive or photochemically stable anisotropic molecules), exhibited photo-induced anisotropy (absorption absorption dichroism and/or birefringence) in a solid state upon the absorption of light. Polarized and non-polarized light can be used as a prephoto-alignment layer for alignment lyotropic liquid crystals and for forming solid state thin films and photo-patterned polarization optical elements.

It can be seen that thin photo-patterned light polarization films can be prepared by the evaporation of an isotropic dye solution, leading to the formation of a nematic lyotropic LC phase on the surface of the thin photo-patterned photo-alignment layer. In this example, after exposure to patterned polarized or non-polarized but directed light, the initially isotropic solid film PAM exhibited photo-induced optical anisotropy and is thus useful as a photo-patterned lyotropic LC alignment layer.

Due to the anisotropic Van-der-Waals molecular dispersion forces between anisotropic molecules of the photo-alignment film and anisotropic molecules of the lyotropic liquid crystal, a homogeneous orientation of the whole lyotropic layer is possible.

This example shows that it is possible to obtain a thin (0.3-0.5 μm) single-layer film which can be used as a neutral or color photo-patterned (pixelated) internal polarizer and/or photo-patterned birefringence phase plate for applications such as LCDs. The element size can be of the order of a few microns. To make a polychromatic polarizer, the highly ordered layer can be coated with a new prephoto-alignment photosensitive layer, and the procedure can be repeated with other lyotropic liquid crystal compositions. The isolation layers can be placed between different polarization films if necessary. The total thickness of the final sandwiched photo-patterned (pixelated) polarizer can be several microns.

Depending on the chemical structure of the lyotropic liquid crystals and molecules of the photo-anisotropic materials, the polarization axis can be oriented either parallel or perpendicular to the photoinduced molecular axis of the photo-alignment layer.

In FIG. 7, the possible variants of the formation of photo-patterned mono- or polychromatic thin film polarizers with different local axis orientation, based on the photoalignment layer, properly oriented on the substrate are provided. The letters R, G, B and D denote dichroic color (Red, Green, Blue) and neutral grey (black) polarizers respectively. The present invention provides for thin (0.3-1 µm thick) photo-patterned (pixelated) polarizers, which are either neutral or colored. This is extremely useful in the field of LCDs.

EXAMPLE 11

A hybrid thin photo-patterned (pixelated) polarization thin film was obtained using a layer of azo dye (AD-1). This can be used as a thin film dichroic photo-patterned polarizer and/or birefringence phase retarder and photo-alignment layer for thin solid layer dyes. When oriented with a lyotropic liquid crystal (Crystal Ink™) from OPTIVA Inc., it may be used as a thin film neutral or color photo-patterned polarizer and/or birefringence phase retarder. The thickness of the hybrid thin photo-patterned (pixelated) polarization thin film was about 0.3-1.5 µm.

This example shows that by using different wavelengths of activating light we can make structures having a patterned photo-induced anisotropy, i.e. the photo-induced optical axis will have different directions across various parts of the surface.

EXAMPLE 12

Photo-sensitive materials based on photochemical stable, anisotropic absorption (dichroic) substances can be used as photo-alignment layers for thermotropic liquid crystals.

Figure 9:
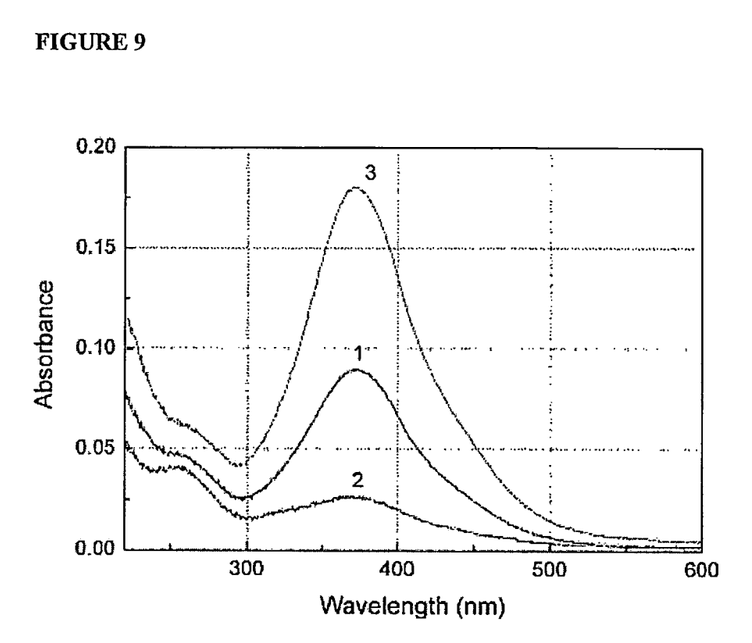
FIG. 9 shows the absorption spectra of 100_A SD1 layer before (1) and after (2 and 3) UV light exposure.

We used a water-soluble azo dye having the following structural formula:

Prephoto-alignment layers of azo dye SD-1 were prepared with a spin-coating method, using 0.1 wt % of SD-1 in dimethylformamide with a thickness of about 10 nm. The isotropic prephoto-alignment layers dried at 100° C. for 15 minutes, then the surface of the layers was exposed to linearly polarized irradiation at about 365 nm from a 1000 W Oriel Xenon arc lamp at a total energy about 1 J/cm$^2$ in a direction perpendicular to a substrate. This exposure led resulted in photo-alignment. FIG. 9 shows the absorption spectra of the SD1 layer before (1) and after (2 and 3) UV light exposure.

Two substrates with ITO and photo-alignment layers were laid so that the polarization plane of the exposed photo-alignment layer on one substrate was at a right angle to that of the other substrate, and then a liquid crystal cell was formed. The liquid crystal cell was filled with a nematic liquid crystal (5CB) in an isotropic phase with conversion in a twist phase under room temperature.

The pixelated regions of these substrates can be different in size relative position. For optimal electro-optic performance (for example, in LCDs), these regions match each other and form a quadruple or polygon structure. When such structures are formed, each quadruple or polygon so formed is referred to as a subpixel, whereas four or more of them constitute a pixel. A special case arises when all local axes are aligned in a particular direction the pixels are then considered, as a single large pixel (covering for example, the whole display area).

In preferred cases, the principal photo-induced orientation axis on each subpixel of the front substrate as aligned at an angle between −180 and 180 degrees with respect to that on the corresponding subpixel of the rear substrate. Preferably each subpixel or pixel has a size of a few microns.

Where a pixelated pattern of arbitrary shape is desired, this can be transferred to the photo-alignment layer using a projection or contact mask aligner. It is preferred that the orientation of the liquid crystal is the same in the exposed regions, while there is no preferred orientation in the unexposed regions. When a mask is used, it may consist of a plurality of regions with different radiation transmittance. There is preferably at least one transparent region and at least one opaque region in the mask. In one embodiment, the mask is an aperture mask, comprising a membrane having at least one aperture thereon. In preferred embodiments the mask is a photolithographic aperture or shadow mask.

When producing multi-domain structures the aperture mask can be manufactured using a thin photo-patterned light-polarization mask in order to maneuver a linearly polarized actinic radiation with a selected space distribution of the polarization vectors. Alternatively, the aperture mask can be manufactured using a photo-patterned thin birefringence mask (i.e. an electronically addressed liquid crystal cell) to maneuver a linearly polarized actinic radiation with a selected space distribution of the polarization vectors.

EXAMPLE 13

This example relates to the use of the inventive materials as solid state photo-patterned polarization (dichroic absorbent) color films. We used azo dye AD-3 with the following structural formula:

A thin film of the azo dye AD-3 was prepared by vacuum sublimation at a pressure of about $2·10^{-5}$ mm Mercury. A super-high-pressure Mercury lamp was used as a source of UV-irradiation, giving a power of 250 W combined with glass light filters and Glan-Thompson prism. Initially, the absorption spectrum of the films were isotropic with a maximum absorption band at λ=320 nm and 540 nm.

After exposure to polarized UV-irradiation (10 mW/cm$^2$, ~20 minutes) the films become photo-anisotropic with size birefringence Δn~0.15 and size of order parameter S~0.58.

EXAMPLE 14

The materials of the invention may be used as chemical and/or constructional material in production of various photo-patterned polarization-optical elements in micro- and nano-technology, photo-patterned polarization-optical elements in fiber and integral optics, photo-patterned thin film phase retarders, photo-sensitive materials for writing, storing and processing of optical images, photo-patterned optical memory and holography, photo-patterned polarization security photo-patterned devices and visual detection devices.

To demonstrate the use of the materials for such purposes, we used a UV photopolymerizable composition based on α,ω-(meth(acryl-(bis-propylene glycol)-2,4-tolyene urethane ($CH_2$=$C(CH_3)$—COO—($CH_2$—$CH_2O)_3$—CO—C($CH_3$)=$CH_2$) and diacetyl ($CH_3$—CO—CO—$CH_3$) as a photoinitiator. The concentration of azo dye AD-1 in the photopolymerizable composition was about 0.02 wt %. The thickness of the solid layer of the photopolymerizable composition was about 1 mm.

Figure 10A:
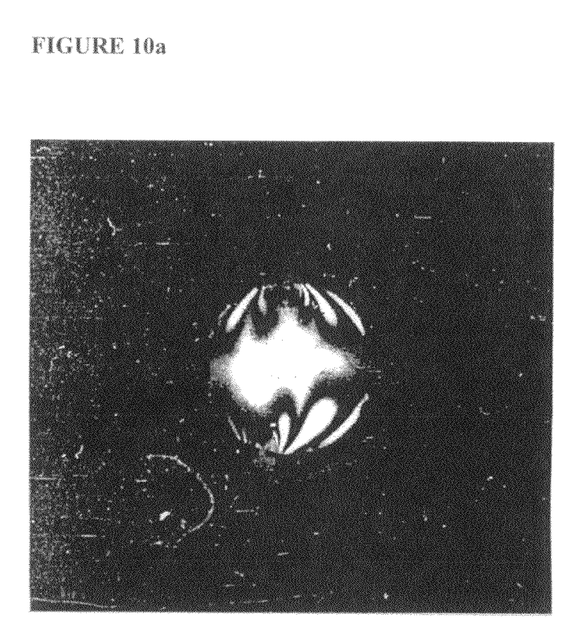
FIGS. 10a and 10b show an embodiment of PAMs applied to a solid state anisotropic absorbing (dichroic) substance.
Figure 10B:
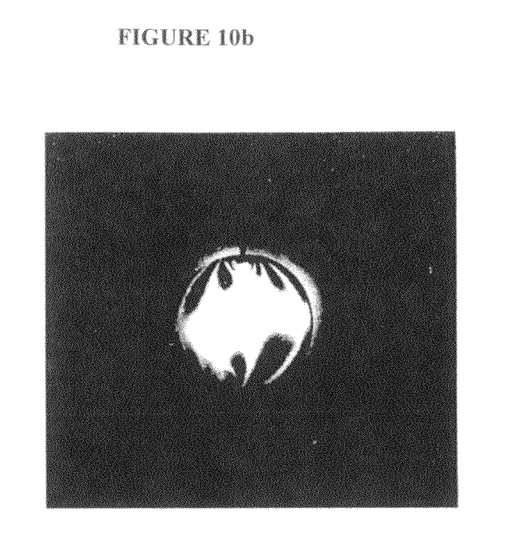

These photo-anisotropic materials were used to study the deformed states of the transparent models using a polarization optical method (photoelasticity approach). The photography of the transparent deformed model is shown in FIG. 10. The image is a hologram of the deformed object, written by non coherent radiation. The hologram can be read using the same non coherent illumination by positioning it between a polarizer and an analyzer. The recorded hologram allows the reconstruction of the necessary data on the anisotropic properties of the object itself.

It will thus be seen that, at least in its preferred forms, the present invention provides novel device structures and fabrication technologies for photo-induced polarizing materials. When the dichroic molecules are optically pumped by a polarized light beam, the probability of their transformation is proportional to the square of the cosine θ, the angle between the transition dipole moments of the molecules and the direction of the polarized light. In other words, the molecules that have their transition dipole moments parallel to the direction of the polarized light will probably undergo the transformation. To minimize the dipolar absorption at the low power density regime, cis-trans isomerization and/or thermal diffusion in a potential field of the actinic light occurs and both lead to a non-uniform distribution of the molecules. In certain dichroic materials, these give rise to long-lasting optical anisotropy and dichroism that are able to polarize the light wave selectively. In a polymer matrix, this induced optical anisotropy and dichroism can be even higher and kept for a long time. This can also be accomplished if the dichroic molecules can be polymerized by thermal or photo treatment. Therefore, a permanent polarizer can be fabricated by a non-contact technique that basically requires an actinic radiation source. In preferred forms of the invention, multi-layers, -axes and -color polarizers using these dichroic materials are also possible and which may have applications, for example, for the wide viewing-angle LCD applications.

What is claimed is:

1. A thin solid state photo-patterned light polarization film, comprising:
    a substrate;
    a photo-patterned lyotropic liquid crystal alignment layer, wherein the photo-patterned lyotropic liquid crystal alignment layer is a photo-anisotropic medium (PAM) layer configured to exhibit photo-induced optical anisotropy in a solid state after exposure to patterned polarized or non-polarized directed light; and
    a lyotropic liquid crystal layer having a homogeneous orientation, wherein the homogenous orientation is based on anisotropic Van-der-Waals molecular dispersion forces between anisotropic molecules the alignment layer and anisotropic molecules of the lyotropic liquid crystal layer.

2. The polarization film of claim 1, wherein the polarization film has a thickness of from 0.3 to 1.5 µm.

3. The polarization film of claim 1, wherein each photo-patterned alignment layer has thickness of from 10 nm to 1.5 µm.

4. The polarization film of claim 1, wherein a polarization axis of the polarization film is oriented parallel or perpendicular to a photo-induced molecular axis of the photo-patterned alignment layer.

5. The polarization film of claim 1, wherein the polarization film is part of a polychromatic polarizer and separated from another polarization film by an isolation layer.

6. The polarization film of claim 1, wherein the polarization film is a monochromatic polarization film.

7. The polarization film of claim 1, wherein the polarization film is a polychromatic polarization film having Red, Green, Blue, and neutral grey domains.

8. The polarization film of claim 1, wherein a photo-induced optical axis of the polarization film has different directions at different locations.

* * * * *